No. 617,947.  
C. E. BLUE.  
MACHINE FOR MANUFACTURING GLASSWARE.  
(Application filed Apr. 21, 1898.)  
Patented Jan. 17, 1899.

(No Model.) 3 Sheets—Sheet 1.

No. 617,947. Patented Jan. 17, 1899.
C. E. BLUE.
MACHINE FOR MANUFACTURING GLASSWARE.
(Application filed Apr. 21, 1898.)
(No Model.) 3 Sheets—Sheet 3.

Witnesses
Geo. E. Frech.
B. E. Seitz

Inventor
C. E. Blue,
by H. S. Pattison
Attorney

UNITED STATES PATENT OFFICE.

CHARLES EDWIN BLUE, OF WHEELING, WEST VIRGINIA.

MACHINE FOR MANUFACTURING GLASSWARE.

SPECIFICATION forming part of Letters Patent No. 617,947, dated January 17, 1899.

Application filed April 21, 1898. Serial No. 678,387. (No model.)

*To all whom it may concern:*

Be it known that I, CHARLES EDWIN BLUE, a citizen of the United States, residing at Wheeling, in the county of Ohio and State of West Virginia, have invented new and useful Improvements in Machines for the Manufacture of Glassware, of which the following is a specification.

My invention relates to improvements in machines for the manufacture of glassware, and pertains to a machine adapted to produce glassware by a pressing and blowing action.

The primary object of my invention is to produce a machine having press and blow molds and mechanism for opening the press-molds after the pressing operation and close the blow-molds around the pressed glass for expanding it to its finished shape.

A further object of my invention is to provide a machine having separate press and blow molds and mechanism for delivering the pressed glass from the press-molds to the blow-molds.

Another object of my present invention is to provide a machine having separate press and blow molds, separate carriers for said molds, and mechanism for automatically delivering the pressed glass from the press-molds to and within the blow-molds.

The object of my present invention also pertains to the construction shown and described whereby the result hereinafter disclosed is produced.

Figure 1:
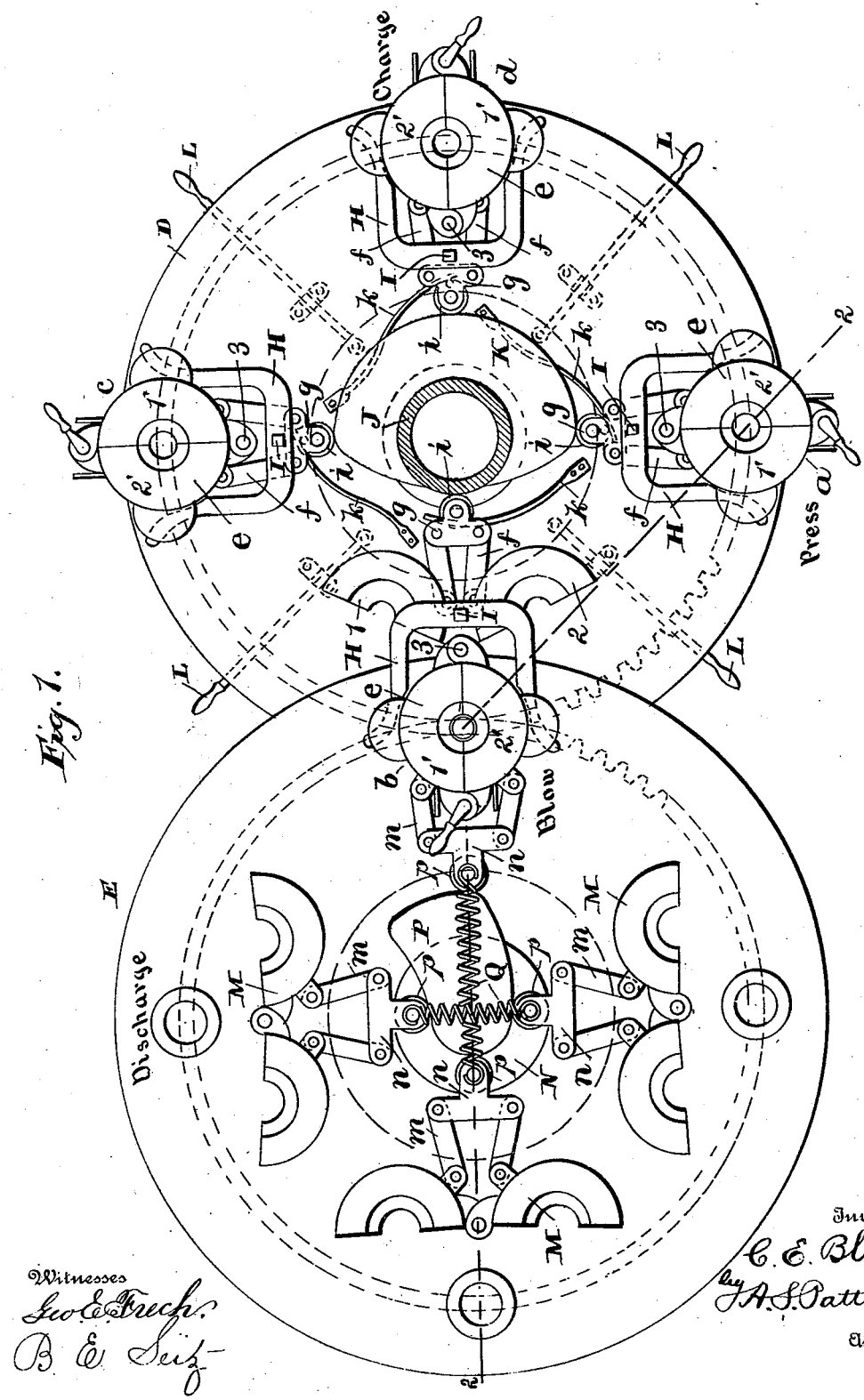
Figure 2:
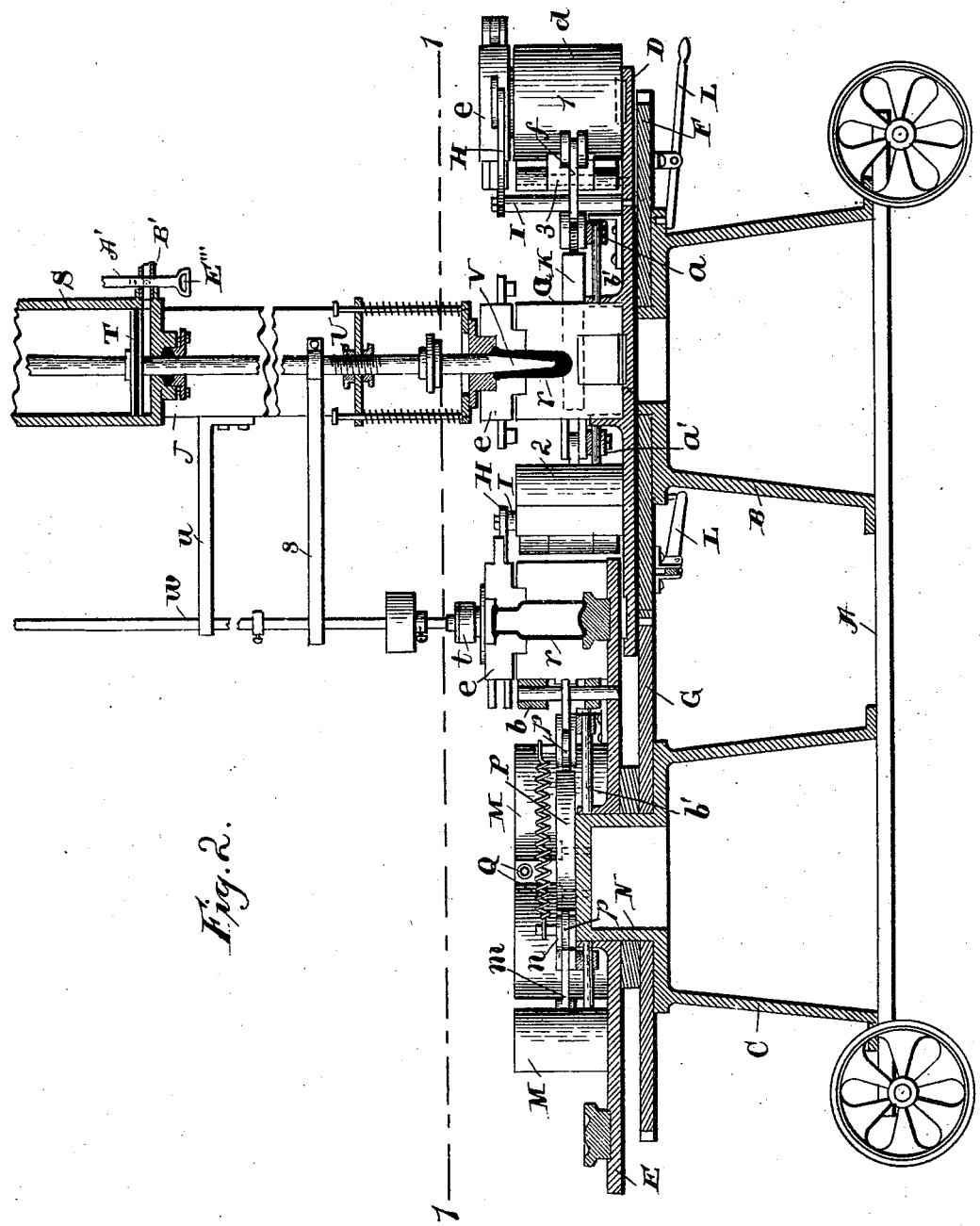
Figure 3:
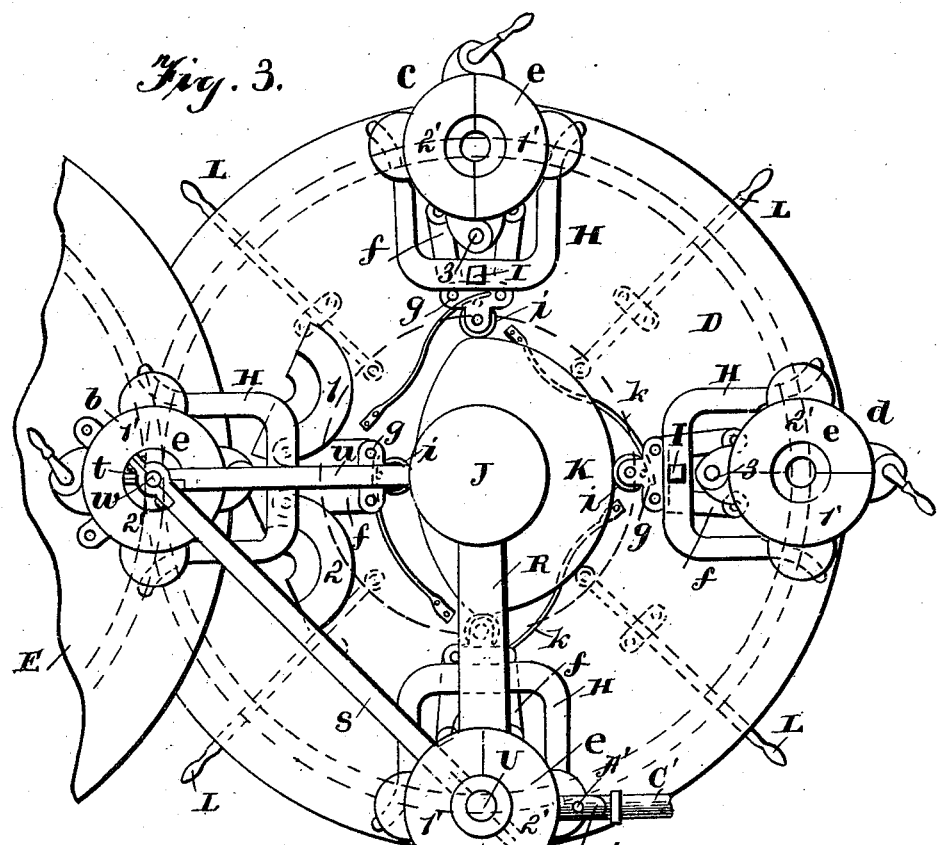
Figure 4:
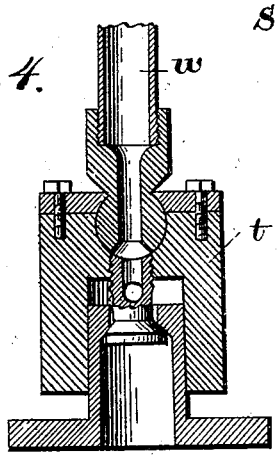
Figure 5:
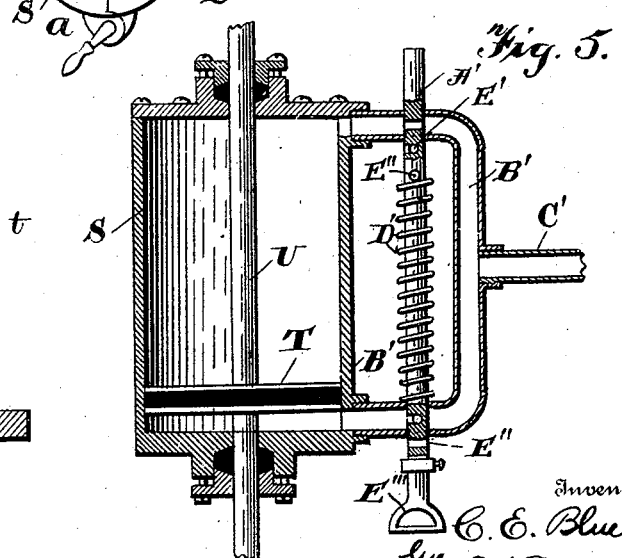

In the accompanying drawings, Figure 1 is a horizontal sectional top plan view taken on the dotted line 1 1 of Fig. 2. Fig. 2 is a vertical sectional view taken on line 2 2 of Fig. 1. Fig. 3 is a top plan view of the table carrying the press-molds and a portion of the table carrying the blow-molds. Fig. 4 is an enlarged sectional view of the blow-head. Fig. 5 is an enlarged sectional view of the cylinder for working the press and blow heads.

Referring now to the drawings, A indicates a base preferably supported upon wheels, the base having at one end a support B for the press-mold table D and at its opposite end a support C for the blow-mold table E. The press-mold table D is provided with a gear F, adapted to intermesh with a gear G upon the blow-mold table, whereby the turning of one table will cause a corresponding turning of the coöperating table.

Situated upon the press-mold table D is a series of press-molds $a$, $b$, $c$, and $d$. The press-mold consists of the two parts 1 and 2, which are hinged together at their inner edges upon a support or post 3, projecting upward from the table D. Coöperating with the press-mold bodies are the neck-rings $e$, which also consist of two or more parts hinged together, whereby the neck-ring may be opened for the purpose of releasing the finished blank. These neck-rings are separate and independent from the press-mold bodies and are supported in position thereon through the medium of the arms H, which are supported upon post I, projecting from the press-mold table D at a point inside the inner side of the press-molds, as clearly shown in Figs. 1 and 2.

Projecting from the support B is a column J, which forms the journal upon which the press-mold table D turns. This column or standard projects considerably above the table, as illustrated.

For the purpose of automatically opening and closing the parts of the press-molds the standard or column J is provided with a cam K, which being connected immovably with the column is stationary in relation to the table D and its molds. Connected with each part of the press-mold is a link $f$, having its outer end pivotally connected with a block $g$, which carries at its inner end, preferably, a friction-wheel $i$, engaging the said cam K. The springs $k$ have one end connected with the table D and their other ends engaging the block $g$, whereby the block is held in normal contact with the cam, thus following its contour as the table is moved around it. When the block $g$ is upon the bulged portion of the cam K, the molds are closed, as shown at $a$, $b$, and $d$. When, however, the block is at the cut-away portion of the cam, as shown at the blow position $c$, the two parts of the mold are thrown open, as clearly shown. When the mold is open, the ring $e$, carried by the mold, is supported by the arm H, as will be readily understood. The table D is provided with handles L between the molds and at the under side thereof, the inner ends of the handles L are adapted to engage with the support B, as clearly illustrated in Fig. 2, whereby the table is supported in its proper position for the pressing and blowing action, as will more clearly appear hereinafter.

The blow-mold table D is provided with a plurality of blow-molds M, consisting of two or more parts, as clearly illustrated in Fig. 1, which are hinged together at their inner sides in the usual way. Projecting from the support B is a short column or projection N, which forms a bearing for the blow-mold table E, as shown in Fig. 2, around which the table rotates. Secured to the upper end of this projection N is a cam P. The blow-molds have connected to each of their parts the links $m$, the inner ends of the links being connected with a block $n$, which carries at its inner side a friction-wheel $p$, adapted to engage the said cam P as the table is rotated around it. The block $n$ of each mold is connected through the medium of springs Q, whereby the blocks are normally drawn inward. This arrangement for drawing the blocks inward may, however, be varied, as will be readily seen, without effecting my invention, the main object of which is to hold the blocks normally inward, and springs similar to the springs $k$, shown in connection with the table D, may be used instead of the springs Q for that purpose. When the blocks $n$ of the blow-molds are forced outward through the medium of the cam P, as shown at the blow position, the blow-molds are closed, and when they are permitted to be drawn inward by the springs, owing to the shape of the cam, the parts of the blow-molds are opened, as clearly illustrated in Fig. 1. When the blow-molds reach the "discharge" position of Fig. 1, they are opened, owing to the shape of the cam P.

Projecting from the column or standard J is an arm R, carrying at its outer end a cylinder S. This cylinder is provided with a piston-head T and a piston-rod U, which extends, preferably, through the cylinder and carries at its lower end a plunger V for forming a blank $r$. (Shown in Fig. 2.) This plunger is of the usual shape, and projecting from the piston-rod Q is an arm $s$, which carries a blow-head $t$. This blow-head $t$ is of the construction fully shown and described in my patent of June 15, 1897, No. 584,665, whereby when the blow-head is seated air is automatically admitted within the blow-mold for expanding the blank and when raised the air is automatically cut off. Therefore the operation and construction of this blow-head need not be here described. Projecting from the piston-rod J is the arm $s$, which, as before stated, supports the blow-head, whereby the blow-head and the plunger are worked together. Extending from the column at a point above the arm $s$ is a rod $u$, through which the standard W of the blow-head passes and by means of which it is guided in its movement. Owing to this construction it will be noted that the blow-head and plunger or presser head are attached, whereby when the presser-head is moved the blow-head is correspondingly actuated.

The operation of my invention is as follows: Glass is placed in one of the press-molds at the "charging" position and the table D rotated to bring the charged mold into the pressing position. In this position the plunger is depressed through the medium of the piston-rod and withdrawn from the mold which forms the blanks $r$. The table D is then rotated to carry the mold from the pressing to the blowing position, and in this movement the two parts of the press-mold are opened through the medium of the cam K and the springs $k$, as clearly shown, and the blow-mold is closed around the depending blank $r$, which is supported by the neck-ring, which is in turn supported by the arms H. When the pressed article has reached the blow position, Fig. 1, and the blow-mold closed therearound, the ring $e$ interlocks with the blow-mold (see Fig. 2) and the further rotation of the table carries the blow-mold, with the ring $e$, to the discharge position, the arms H simply sliding from under the ring as the tables are rotated, in much the same manner as one cog of a wheel becomes disengaged from another wheel when they are rotated. Before the blow-mold reaches the discharge position the blow-mold is automatically opened, and the discharge-boy receives the ring, with the blown article, and opens it, taking the article therefrom, and again places the ring $e$ upon the arms H of the table D at the point preceding the charging-point, Fig. 1. There is preferably a neck-ring $e$ for each press-mold and preferably as many blow-molds as there are press-molds. From this description it will be noted that the blank is delivered from the press-mold to and within the blow-mold and that while a blank is being pressed another previously-pressed blank is blown. The neck-rings $e$ are opened and locked closed by means of the handles.

The operation of the piston T is controlled through the medium of a valve-rod A', which passes through the pipes B', which communicate, respectively, with the upper and lower ends of the cylinder. Communicating with these pipes is a source of pressure-supply through the pipe C', and the valve-rod A' is constructed so that when drawn downward air will be admitted above the piston for carrying the plunger down, and when released the valve is carried upward by the spring D', admitting air below the piston. In each case the valve-rod is constructed with an outlet-opening E', whereby air is permitted to escape from one end of the cylinder while being admitted to the other end through the inlet-opening E, and E' is a handle for operating the valve-rod.

The blocks $g$ and $n$ of the two tables are provided with collars $a'$, sliding upon horizontal rods $b'$, whereby they are supported and guided in their movements, as will be clearly understood from the drawings.

I do not limit myself to the particular mechanism here shown for opening and closing the press and blow molds, for this may be varied without departing from the spirit and scope of my invention.

Having thus described my invention, what I claim, and desire to secure by Letters Patent, is—

1. A machine for the manufacture of glassware, comprising a press-mold, a separate blow-mold, separate carriers for the said molds, and mechanism actuated by the movement of the carriers for discharging the blank from the press-mold and delivering it to and within the blow-mold.

2. A machine of the character described comprising separate and independent vertically-separable press and blow molds, independent members adapted to open and close the press and blow molds respectively, and an operating mechanism common to said independent members, substantially as described.

3. A machine of the character described comprising separable press and blow molds, members for opening and closing the said molds, a mouth-ring adapted to coöperate with said molds, a movable carrier for said mouth-ring, and an operating mechanism common to the mold opening and closing members and the ring-carrier, whereby the pressed blank is removed from the press-mold carried to the blow-mold and the blow-mold closed therearound, substantially as described.

4. A machine for the manufacture of glassware comprising separable press and blow molds, a presser-head, a mouth-ring independent of said presser-head, and a movable carrier for said separate mouth-ring adapted to carry the pressed blank to and within the the blow-mold.

5. A machine for the manufacture of glassware comprising a vertically-separable press-mold, a horizontally-moving carrier therefor, a vertically-separable blow-mold, a horizontally-movable carrier therefor, a mouth-ring for and separate from the press-mold, the press-mold carrier having a support for the ring, and mechanism for moving the carrier and discharging the blank laterally from the press-mold and delivering it laterally to the blow-mold.

6. A machine for the manufacture of glassware comprising a separable press-mold, a carrier therefor, a separable blow-mold, a carrier therefor, the carriers operatively connected, the press-mold carrier having a mouth-ring support, and a mouth-ring separate and removable from its said support by the movement of the mold-carriers.

7. A machine for the manufacture of glassware comprising a horizontally-movable press-mold carrier, a vertically-separable press-mold thereon, a blow-mold carrier, a vertically-separable blow-mold thereon in practically the same horizontal plane as the press-mold, the press-mold carrier having a support for a mouth-ring, a mouth-ring for and separate from the press-mold and its carrier, whereby the movement of the carriers will laterally discharge the blank from the press-mold and laterally deliver it to the blow-mold.

8. A machine for the manufacture of glassware comprising a press-mold carrier, a separable press-mold carried thereby, a blow-mold carrier, a separable blow-mold carried thereby, a member connected with and adapted to open the press-mold, said member actuated through the medium of the press-mold carrier, a member for closing the blow-mold and actuated through the medium of the blow-mold carrier, the parts adapted to operate as described.

9. A machine for the manufacture of glassware comprising a press-mold carrier, a separable press-mold carried thereby, a cam stationary in respect to the carrier, a member connected with and adapted to open the press-mold, said member actuated by the cam, a blow-mold carrier, a separable blow-mold carried thereby, a member adapted to close the blow-mold, a cam stationary in respect to the blow-mold carrier adapted to actuate the said mold-closing member.

10. A machine for the manufacture of glassware comprising a press-mold carrier, a separable press-mold carried thereby, a blow-mold carrier, a separable blow-mold carried thereby, a member for opening the press-mold, a member for opening the blow-mold, an actuating member for the said opening and closing member, the said actuating member situated and constructed to open the press-mold and to close the blow-mold after the press-mold is opened.

11. A machine for the manufacture of glassware comprising a rotating press-mold carrier, a separable press-mold carried thereby, a rotating blow-mold carrier, a separable blow-mold carried thereby, operating connections between the said carriers for moving them uniformly, a member for opening the press-mold, a stationary cam for actuating the press member as the carrier is rotated, a member for opening the blow-mold, a stationary cam for actuating the said member, the cams for actuating the members of the press and blow molds extending to opposite sides of the axes of the said carriers.

12. A machine for the manufacture of glassware comprising a rotating press-mold carrier, a press-mold carried thereby, a rotating blow-mold carrier, a blow-mold carried thereby, an operating connection between the said carriers for moving them uniformly, blocks, links connecting the blocks and the parts of the molds, and cams for actuating the blocks, the cams situated at opposite sides of the axes of the rotating carriers.

13. A machine for the manufacture of glassware comprising a press-mold carrier, a plurality of independent separable press-molds carried thereby, a separate blow-mold carrier, a plurality of independent separable blow-molds carried thereby, and an actuating mechanism constructed and adapted to alternately open and close the said independent press and blow molds respectively.

14. A machine for the manufacture of glassware comprising a press-mold carrier, a vertically-separable press-mold carried thereby, a blow-mold carrier, a separable blow-mold carried thereby and in the path traveled by the press-mold, and mechanism constructed and adapted to open the press-mold when it is in the path of the blow-mold and to close the blow-mold when in the path traversed by the press-mold, the parts thus adapted to deliver the blank from the press to the blow mold.

15. A machine for the manufacture of glassware comprising a horizontally-movable vertically-separable blow-mold, a horizontally-movable vertically-separable press-mold, said press and blow molds moving in intersecting horizontal paths, and a mechanism constructed and adapted to open the press-mold and close the blow-mold when they are at the intersecting-point.

In testimony whereof I have hereunto set my hand in the presence of two subscribing witnesses.

CHARLES EDWIN BLUE.

Witnesses:
  A. G. HUBBARD,
  W. B. JONES.